(12) United States Patent
Do et al.

(10) Patent No.: US 7,110,190 B2
(45) Date of Patent: Sep. 19, 2006

(54) IMAGING LENS

(75) Inventors: Satoshi Do, 1-2-56 Miyado, Asaka-shi, Saitama 351-0031 (JP); Yoshiyuki Hashimoto, Saitama (JP)

(73) Assignees: Milestone Col., Ltd., Saitama (JP); Satoshi Do, Tokyo (JP)

( * ) Notice: Subject to any disclaimer, the term of this patent is extended or adjusted under 35 U.S.C. 154(b) by 56 days.

(21) Appl. No.: 10/873,111

(22) Filed: Jun. 23, 2004

(65) Prior Publication Data

US 2005/0157408 A1     Jul. 21, 2005

(30) Foreign Application Priority Data

Jan. 16, 2004   (JP)   ............... 2004-008966

(51) Int. Cl.
 *G02B 13/18* (2006.01)
(52) U.S. Cl. ...................... 359/717; 359/794
(58) Field of Classification Search ............... 359/691, 359/717, 793, 794
 See application file for complete search history.

(56) References Cited

U.S. PATENT DOCUMENTS

| 4,525,039 | A | | 6/1985 | Defuans |
| 5,710,670 | A | * | 1/1998 | Ohno ..................... 359/691 |
| 6,876,500 | B1 | * | 4/2005 | Sato ..................... 359/717 |
| 6,885,508 | B1 | * | 4/2005 | Yamaguchi et al. ........ 359/717 |
| 2002/0012176 | A1 | | 1/2002 | Ning |
| 2005/0036217 | A1 | * | 2/2005 | Nozawa ................... 359/793 |

FOREIGN PATENT DOCUMENTS

| JP | 07-181379 | 7/1995 |
| JP | 2000-066094 | 3/2000 |
| JP | 2000-066095 | 3/2000 |
| JP | 2000-066096 | 3/2000 |
| JP | 2000-75203 | 3/2000 |
| JP | 2000-081568 | 3/2000 |
| JP | 2003-005026 | 1/2003 |
| JP | 2003-005027 | 1/2003 |
| JP | 2003-005055 | 1/2003 |
| JP | 2003-167187 | 6/2003 |
| JP | 2003-295052 | 10/2003 |
| JP | 2004-004620 | 1/2004 |
| JP | 2004004620 | 1/2004 |
| JP | 2005-107254 | 4/2005 |
| JP | 2005-107368 | 4/2005 |
| JP | 2005-107370 | 4/2005 |
| WO | WO 2005/026804 | 3/2005 |

* cited by examiner

*Primary Examiner*—Scott J. Sugarman
*Assistant Examiner*—Darryl J. Collins
(74) *Attorney, Agent, or Firm*—Venable, LLP; James R. Burdett

(57) ABSTRACT

The present invention relates to an imaging lens with an number in the range 4.0, configured from two lenses, with a short lens optical length, and with sufficiently high image contrast so that sharp images are obtained. The imaging lens is configured by positioning, order from an object side to an image side, an aperture diaphragm, diaphragm, and a second lens, satisfying the following first lens, a second conditions. The first lens and second lens are both meniscus-shaped with convex surface facing the positive refractive power.

4 Claims, 13 Drawing Sheets

Back Focus = 0.459mm

Optical Length = 1.076mm

US 7,110,190 B2

IMAGING LENS

BACKGROUND OF THE INVENTION

1. Field of the Invention

The present invention relates to an imaging lens, and in particular to an imaging lens suitable for mounting in a portable telephone, image input device for a personal computer, digital camera, surveillance CCD camera, inspection device, or similar equipment, which uses a CCD or CMOS device as an imaging component.

2. Description of Related Art

In the above-described imaging lens, it is necessary that the optical length, defined as the distance from the incidence plane on the object side of the imaging lens to the image plane (image-forming surface of the CCD or similar), be short. That is, in the design of the imaging lens, measures must be taken to reduce insofar as possible the ratio of the optical length to the combined focal length of the imaging lens. Hereafter, an imaging lens with a short optical length, that is, the ratio of the optical length to the focal length of which is small, may be called a "compact" lens.

Taking a portable telephone as an example, the optical length must at least be made shorter than the thickness of the portable telephone unit. On the other hand, it is preferable that the back focus, defined as the distance from the emission plane on the image side of the imaging lens to the image plane, be as long as possible. That is, in the design of the imaging lens, measures should be taken to increase insofar as possible the ratio of the back focus to the combined focal length of the imaging lens. This is due to the need to insert filters, cover glass, and other components between the imaging lens and the image plane.

In addition to the above, it is of course required that the various aberrations of an imaging lens are corrected to amounts sufficiently small that distortion of the image formed by this imaging lens is not recognized by visual perception, and sufficiently small as to satisfy the requirements of the integration density of the imaging components (also called "pixels"). That is, the various aberrations must be corrected satisfactorily; below, an image for which various aberrations are satisfactorily corrected may be called a "satisfactory image".

As stated below, imaging lenses with a two-component configuration have been disclosed which are appropriate for use in image equipment employing a CCD, CMOS device or other solid-state image pickup component, of which portable computers and videophones are representative. In addition to obtaining satisfactory images, such lenses are all designed for small size and light weight.

Of these, as a first lens, an infrared lens has been disclosed with a two-component configuration comprising two meniscus lenses (a first lens and a second lens), designed for low cost and for reduced weight, which is compact and has adequate image-forming performance for practical use. (See for example Japanese Unexamined Patent Application Publication No. 2000-75203.)

However, such an infrared lens has a broad interval D between the first lens and second lens, so that as a result the optical length is necessarily long, and design of a sufficiently compact lens system is difficult. The ratio D/f of the interval D between the first and second lenses to the focal length f of the entire system (the combined focal length of the two-component lens system) is at least 0.8. Consequently, the ratio of the optical length to the focal length of the entire system is large at approximately 1.5 (the value for the lens in Embodiment 6, with the smallest value, is 1.4236), so that the optical length of such lenses is long.

As a second two-component lens, an anamorphic attachment lens has been disclosed (see for example Japanese Unexamined Patent Application Publication No. 2000-81568), in which an image of the object is focused with different vertical and horizontal magnifications by one afocal lens comprising cylindrical surfaces both of which have refractive power only in the same direction and have radii of curvature with the same sign, and which can project images more slim or more thick than the actual object. Such an anamorphic attachment lens is positioned and used on the object side of a still camera lens system in particular.

However, while the anamorphic attachment lens is a lens system configured as a two-component lens, the surface shapes of the component lenses of the anamorphic attachment lens are not spherical, as in the case of ordinary lenses, but are cylindrical surfaces. Hence the basic configuration differs from that of the imaging lens of the present invention.

As a third two-component lens, an objective lens for recording and reproduction of information on optical information recording media a large operating distance for which is secured has been disclosed, in which a lens group having two components with positive refractive power has a large NA (numerical aperture) of 0.85, and which is appropriate for incorporation into optical pickup devices with light source wavelengths of 500 nm or below, with chromatic aberration corrected satisfactorily (see for example Japanese Unexamined Patent Application Publication No. 2003-167187). And, as fourth through sixth two-component lenses, objective lenses for high-performance, small-size optical pickups, having a large numerical aperture and long working distance, have been disclosed (see for example Japanese Unexamined Patent Application Publication No. 2003-5026, Japanese Unexamined Patent Application Publication No. 2003-5027, and Japanese Unexamined Patent Application Publication No. 2003-5055).

However, these objective lenses are designed with a small NA, for the purpose of using the objective lens to focus parallel rays into as small an area as possible on the information recording surface; the imaging lenses of the present invention are inherently different in concept from these. Consequently the values of the focal lengths, back focuses, and optical lengths of each of the two lenses making up the lens system, and the interval between lenses, are different from the imaging lenses of the present invention. Whereas a numerical aperture of 0.85 or higher, converted into an F-number, yields a value of 1 or below, the F-number of an imaging lens of the present invention ($F_{no}$) is in the range $2.0<F_{no}<4.0$, for a very bright lens.

As indexes representing the brightness of a lens (or lens system), in order to distinguish between the numerical aperture (NA) represented by the product n·sin(u) of the object-side refractive index n and the angle u subtended by the radius of the entrance pupil, and the F-number represented as the ratio $f/D_{in}$ of the lens focal length f to the diameter of the entrance pupil $D_{in}$, in this specification a value representing the numerical aperture will be denoted by NA, and a value representing the F-number will be denoted by $F_{no}$. These two variables are, in approximation, reciprocals of each other.

As the seventh two-component lens, a bright, compact infrared lens is disclosed (see for example Japanese Unexamined Patent Application Publication No. 2003-295052), in which comparatively inexpensive material is used, costs are reduced, and the effects of unwanted orders of diffracted light, which are a disadvantage of diffraction gratings, are eliminated. Of the two component lenses of this infrared lens, a diffraction grating is formed on the concave surface of a meniscus lens positioned on the object side. Hence the components are completely different, and the lens system completely different, from an imaging lens of the present invention, which does not employ a diffraction grating as a component.

As the eighth two-component lens, an image-forming lens is disclosed comprising a front-group lens having positive refractive power, an aperture, and a rear-group lens, with $F_{no}=4$, a half-image angle of approximately 24°, with aberrations satisfactorily corrected, and appropriate for image pickup in fax equipment and similar (see for example Japanese Unexamined Patent Application Publication No. 7-181379).

However, this image-forming lens system has a short back focus, so that insertion of a filter or similar between lenses and image plane to block infrared light is difficult. The ratio $b_f/f$ of the back focus $b_f$ to the focal length f of the entire system (the combined focal length of the two-component lens system) is at most 0.38 (Embodiment 5).

As the ninth through 11th two-component lenses, imaging lenses are disclosed comprising an image-forming lens (first lens) and corrective lens (second lens) (see for example Japanese Unexamined Patent Application Publication No. 2000-66094, Japanese Unexamined Patent Application Publication No. 2000-66095, and Japanese Unexamined Patent Application Publication No. 2000-66096).

However, these imaging lenses have a configuration in which the thickness of the image-forming lens on the optical axis is large. Consequently the refractive index tends to be distributed unevenly when configuring the lens, and image distortion and similar occur due to such uneven distribution of the refractive index, so that in some cases the image quality which should result from lens design cannot be obtained.

As the 12th two-component lens, an imaging lens with comparatively small image dimensions, and which in particular enables performance appropriate to mounting in small-size image pickup equipment, is disclosed (see for example Japanese Unexamined Patent Application Publication No. 2004-4620). This imaging lens is configured by positioning, in order from the object side, an aperture diaphragm, a first lens, and a second lens. That is, a configuration is employed in which a diaphragm is not provided between the first and second lens. Consequently flare cannot be eliminated adequately, and consequently there are limits to the ability to raise the contrast of the image and obtain sharp images.

Further, the ratio d/f of the optical length d to the focal length f for the entire system (the combined focal length of the two-component lens system) exceeds 1.3, except for the imaging lens disclosed as Embodiment 9. That is, in this design the optical length is long, and compactness cannot be completely attained. On the other hand, the ratio d/f of the optical length d to the focal length f for the entire system of the imaging lens disclosed as Embodiment 9 is 1.137; but the ratio $D_2/f$ of the interval $D_2$ between the first and second lenses to the focal length f of the entire system for this imaging lens is extremely small, at 0.11. Consequently in this configuration, a diaphragm could not easily be inserted as a second diaphragm between the first and second lenses.

However, in order to accommodate the more compact designs of portable telephone units, image input equipment for personal computers and other equipment, it is desirable that the optical length of the imaging lens mounted in such equipment be short, and in addition it is required that satisfactory images be captured.

An object of the present invention is to provide an imaging lens, the F-number of which is in the range 2.0 to 4.0, configured with only two component lenses, with a short lens optical length, and capable of obtaining satisfactory images. In addition, a further object is to provide an imaging lens in which, by providing a diaphragm between the first lens and second lens to adequately eliminate flare, image contrast can be increased sufficiently that sharp images can be obtained.

A further object is to be provide an imaging lens which achieves low costs and light weight by using plastic material for all the lenses (two lenses) making up the imaging lens. Here, a "plastic material" is a polymer material which can be molded to form a lens by plastic deformation using heat or pressure, or both, and which is transparent to visible light.

SUMMARY OF THE INVENTION

In order to achieve the above objects, an imaging lens of the present invention is configured by positioning, in order from an object side to an image side, an aperture diaphragm $S_1$, a first lens $L_1$, a second diaphragm $S_2$, and a second lens $L_2$. The first lens $L_1$ is a meniscus-shape lens, with the convex surface facing the object side, having positive refractive power. The second lens $L_2$ is a meniscus-shape lens, with the convex surface facing the object side, having positive refractive power.

In a preferred configuration example of the present invention, the imaging lens satisfies the following conditions.

$$0.3 < f_1/f_2 < 1.0 \quad (1)$$

$$0.4 < b_f/f < 0.5 \quad (2)$$

$$1.0 < d/f < 1.3 \quad (3)$$

$$0.12 < D_2/f < 0.30 \quad (4)$$

$$2.0 < F_{no} < 4.0 \quad (5)$$

Here f is the combined focal length of the imaging lens, $f_1$ is the focal length of the first lens $L_1$, $f_2$ is the focal length of the second lens $L_2$, $b_f$ is the distance (in air) from the image-side surface of the second lens $L_2$ to the image plane, d is the distance (in air) from the object-side surface of the first lens $L_1$ to the image plane, $D_2$ is the interval between the first lens $L_1$ and the second lens $L_2$, and $F_{no}$ is the F-number.

It is preferred that the first lens $L_1$ and second lens $L_2$ making up an imaging lens of the present invention be formed from material with an Abbe number from 30 to 60. Also, the first lens $L_1$ and second lens $L_2$ making up an imaging lens of the present invention may be formed from cycloolefin plastic or polycarbonate materials.

The above condition equation (1) is a condition stipulating the ratio $f_1/f_2$ of the focal length $f_1$ of the first lens $L_1$ to the focal length $f_2$ of the second lens $L_2$. If this ratio $f_1/f_2$ is larger than a certain lower limit, the various aberrations occurring in the first lens $L_1$ can be corrected. In particular, by correcting distortion, extreme deformity of the image resulting from the existence of this distortion can be prevented. Further, it is possible to prevent a situation in which molding is difficult because the radius of curvature of the first lens $L_1$ is too small.

On the other hand, if the ratio $f_1/f_2$ is smaller than the upper limit given by the condition equation (1), the lens can be made sufficiently compact to enable use as an imaging lens for mounting in a portable telephone, the image input device of a personal computer, a digital camera, surveillance CCD camera, inspection equipment and similar. That is, the back focus can be made sufficiently short, and as a result the optical length is not too long. Moreover, various aberrations occurring in the second lens $L_2$ can be adequately corrected.

The above condition equation (2) is a condition to secure an adequate length for the distance $b_f$ from the image-side surface of the second lens $L_2$ to the image plane (the back focus), and to secure space for insertion of cover glass, a filter, or similar. That is, this condition equation stipulates a condition to be satisfied by the ratio $b_f/f$ of the back focus $b_f$ to the combined focal length f of an imaging lens of the present invention in order to enable insertion of cover glass, a filter or similar.

If the ratio $b_f/f$ is larger than the lower limit given by condition equation (2), an adequate back focus can be secured, and a construction is possible enabling easy insertion of cover glass, a filter, or similar.

On the other hand, if the ratio $b_f/f$ is smaller than the upper limit given by condition equation (2), the back focus is not too long and an imaging lens can be realized in which an optical length is obtained appropriate for mounting in a portable telephone unit, an image input device of a personal computer, and similar. Even if the ratio $b_f/f$ exceeds the upper limit given by the condition equation (2), the possibility of making the interval between the first lens $L_1$ and second lens $L_2$ short to shorten the optical length can be studied; but at present it is difficult to form an imaging lens enabling acquisition of satisfactory images in which various aberrations have been adequately corrected. That is, with the interval between the first lens $L_1$ and second lens $L_2$ set to a small value, in the process of injection molding of the first lens $L_1$ and second lens $L_2$ in shapes enabling adequate correction of aberrations, the lens shapes are such that it is difficult to pour the lens material into molds so as to form a shape which accurately reflects the shape of the mold.

The above condition equation (3) is a condition equation stipulating the ratio d/f of the distance d from the object-side surface of the first lens $L_1$ to the image plane (the optical length) to the combined focal length f of an imaging lens of the present invention. If the ratio d/f is larger than the lower limit given by condition equation (3), the thicknesses of the first lens $L_1$ and second lens $L_2$ can be set such that injection molding of these lenses is possible. Also, the back focus $b_f$ can be set sufficiently long that the effective diameter of the second lens is not so large as to impede compactness of the imaging lens.

On the other hand, if the ratio d/f is smaller than the upper limit given by condition equation (3), the optical length is not so long that compactness of the imaging lens of the present invention is impeded, and a satisfactory image can be obtained in which the brightness is uniform across the entire image, without making the ratio of the quantity of light at the periphery to the quantity of light at the center of the image too small.

The above condition equation (4) is a condition equation which specifies the range for values of the ratio $D_2/f$ of the interval $D_2$ between the first lens $L_1$ and second lens $L_2$ and the combined focal length f of an imaging lens of the present invention. If the ratio $D_2/f$ is larger than the lower limit given by condition equation (4), then the interval between the image-side surface $r_3$ of the first lens $L_1$ and the object-side surface $r_5$ of the second lens $L_2$ is not too small, and a second diaphragm $S_2$ can be inserted into the space between the first lens $L_1$ and the second lens $L_2$. A second diaphragm $S_2$ plays an important role in obtaining sharp images with sufficiently high contrast, by sufficiently eliminating rays not contributing to image formation which occur on the outer periphery of the first lens $L_1$ and second lens $L_2$ and inside the cylindrical barrel holding the imaging lens.

Further, by adjusting the resolving power at the center of the image such that a satisfactory image is obtained, image plane curvature of field occurring in the negative direction can be made sufficiently small. That is, by adjusting the resolving power at the center of the image to the extent that a satisfactory image is obtained, the effect of movement of the satisfactory image position at the periphery of the image toward the object side from the image plane position can be reduced sufficiently.

If the ratio $D_2/f$ is larger than the lower limit given by condition equation (4), an interval between the image-side surface $r_3$ of the first lens $L_1$ and the object-side surface $r_5$ of the second lens $L_2$ can be secured which is sufficiently large to enable insertion of a second diaphragm $S_2$. Further, curvature of field occurring in the negative direction is not so large that adequate resolution at the periphery of the image is not obtained. That is, by adjusting the resolving power at the center of the image sufficiently that a satisfactory image can be obtained, the image plane curvature of field occurring in the negative direction can be made sufficiently small. In other words, by adjusting the resolving power at the center of the image sufficiently to obtain a satisfactory image, the effect of forward movement from the image plane position of the satisfactory resolution position at the periphery of the image can be reduced sufficiently.

If on the other hand the ratio $D_2/f$ is smaller than the upper limit given by the condition equation (4), a situation in which the back focus is too short and the effective diameter of the second lens $L_2$ is too large, so that the imaging lens cannot be made compact, can be avoided. Further, curvature of field occurring in the positive direction is not so large that adequate resolution is not possible at the periphery of the image. That is, by adjusting the resolving power at the center of the image sufficiently that a satisfactory image is obtained, the image plane curvature of field occurring in the positive direction can be made sufficiently small. In other words, by adjusting the resolving power at the center of the image sufficiently to obtain a satisfactory image, the effect of backward movement from the image plane position of the satisfactory resolution position at the periphery of the image can be reduced sufficiently.

The above condition equation (5) is a condition equation stipulating the range of values of the F-number of an imaging lens of the present invention. If the F-number is larger than the lower limit given by the condition equation (5), then a depth of field sufficient to enable use as an imaging lens mountable in a portable telephone, image input device for a personal computer, digital camera, surveillance CCD camera, inspection equipment and similar is secured. If the depth of field is too shallow, that is, if the F-number is too small, it is difficult to simultaneously focus over a broad range of the image, and use is impeded.

If on the other hand the F-number is smaller than the upper limit given by the condition equation (5), then an image with satisfactory brightness can be obtained, without excessively dark images, and without insufficient light quantity arriving at the image plane of the portable telephone, image input device for a personal computer, digital camera, surveillance CCD camera, inspection equipment, or similar.

As explained above, by adopting a lens configuration satisfying the five conditions of the above condition equations (1) through (5), an imaging lens can be provided with an F-number in the range from 2.0 to 4.0, configured from only two lenses, with a short lens optical length, and from which satisfactory images are obtained. In addition, by providing a diaphragm between the first lens and second lens to sufficiently eliminate flare, an imaging lens can be provided with sufficiently enhanced image contrast and from which sharp images are obtained.

By means of an imaging lens of the present invention, it is possible to form all of the lenses (two lenses) making up the imaging lens of the present invention from plastic material, so that imaging lenses can be provided at low cost and which are light in weight.

BRIEF DESCRIPTION OF THE DRAWINGS

The foregoing and other objects, features and advantages of the present invention will be better understood from the following description taken in connection with the accompanying drawings, in which.

DESCRIPTION OF THE PREFERRED EMBODIMENTS

Figure 1:
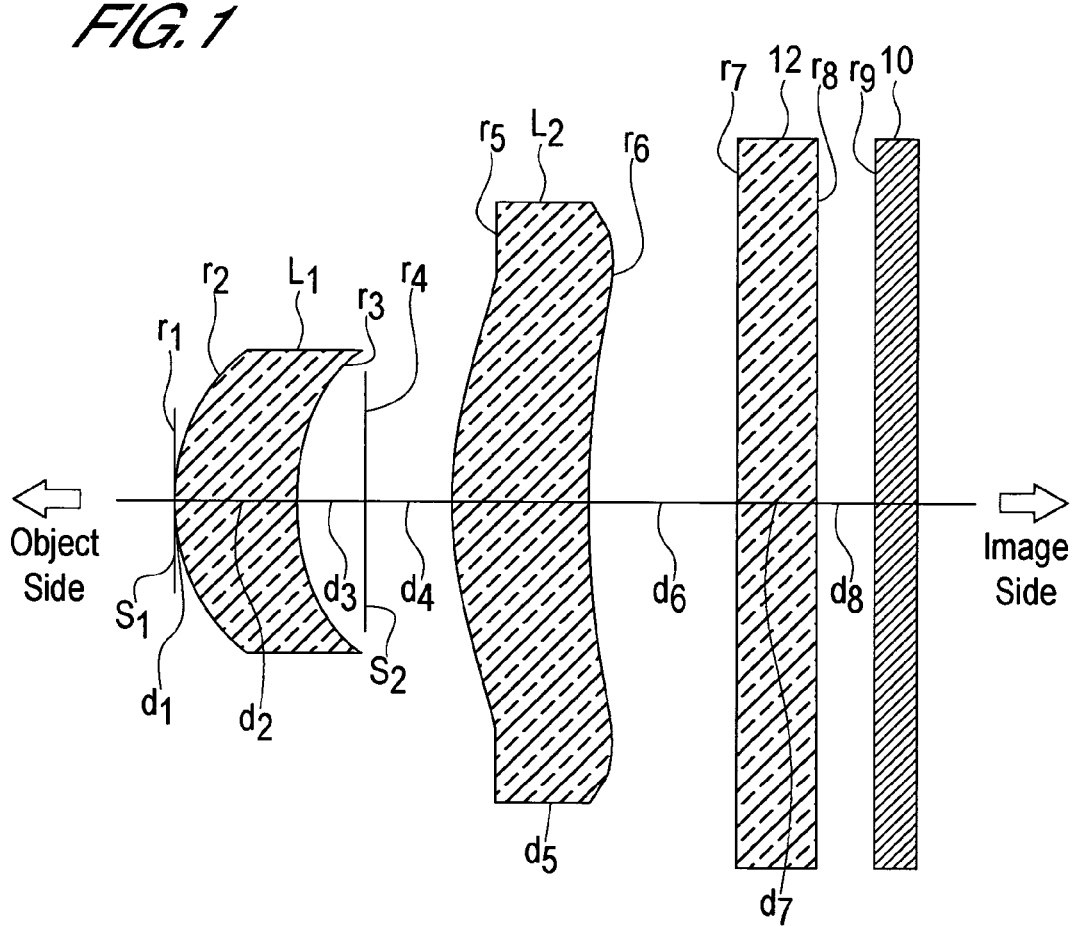
FIG. 1 is a cross-sectional view of an imaging lens of the present invention.

Below, aspects of the present invention are explained, referring to the drawings. These drawings merely show in summary the shapes, sizes and positional relationships of the components to an extent sufficient to enable understanding of the invention, and the numerical values and other conditions in the explanations below are merely appropriate examples; the present invention is in no way limited to the aspects of the present invention.

FIG. 1 is a drawing of the configuration of an imaging lens of the present invention. The surface numbers, intervals between surfaces and other symbols defined in FIG. 1 are used in common in FIG. 2, FIG. 6, FIG. 10, and FIG. 14.

In order from the object side, the first and second lenses are denoted by $L_1$ and $L_2$ respectively. The image component comprising the image plane is denoted by 10, the cover glass separating the image plane and lens system is denoted by 12, and the aperture diaphragm and second diaphragm are denoted by $S_1$ and $S_2$ respectively. The aperture portions of the aperture diaphragm $S_1$ and second diaphragm $S_2$ are indicated by line segments.

The $r_i$ (i=1, 2, 3, . . . , 9) and $d_i$ (i=1, 2, 3, . . . , 8) and other parameters are given as concrete numerical values in Table 1 through Table 4 below. The subscript i denotes the order in moving from the object side to the image side, and values are assigned corresponding to the lens surface number, the lens thickness, lens interval, and similar.

That is, $r_i$ is the radius of curvature on the axis of the ith surface; $d_i$ is the distance from the ith surface to the i+1th surface; $N_i$ is the refractivity of the material of the lens comprising the ith surface and i+1th surface; and $v_i$ is the Abbe number of the material of the lens from the ith surface to the i+1th surface. In this specification, $r_i$ indicates the radius of curvature on the axis of the ith surface, and, so long as there is no chance of misunderstanding, may also refer to the ith surface itself.

The optical length d is the result of adding $d_1$ to $d_5$ and further adding the back focus $b_f$. The back focus $b_f$ is the distance on the optical axis from the image-side surface of the second lens $L_2$ to the image plane. However, the back focus $b_f$ is measured with the cover glass, inserted between the second lens $L_2$ and the image plane, removed. That is, in the state in which the cover glass is inserted, the geometrical distance from the image-side surface of the second lens $L_2$ to the image plane is greater than with the cover glass removed, due to the fact that the refractivity of the cover glass is greater than 1. The extent to which the back focus is longer is determined by the refractivity and thickness of the inserted cover glass. In order to define a back focus $b_f$ as a value characteristic to the imaging lens and which does not depend on whether cover glass exists, a value obtained by measuring with the cover glass removed was adopted. Also, the interval $D_2$ between the first lens $L_1$ and second lens $L_2$ is $D_2 = d_3 + d_4$.

Aspheric data is shown in the rightmost columns of Table 1 through Table 4, together with surface numbers. The surface $r_1$ of the aperture diaphragm $S_1$ and the surface $r_4$ of the second diaphragm $S_2$, as well as the $r_7$ and $r_8$ of the cover glass and the image plane $r_9$, are planes, so that $\infty$ is given as the radius of curvature.

The aspheric surfaces used in the present invention are given by the equation $$Z = ch^2/[1+[1-(1+k)c^2h^2]+^{1/2}] + A_0h^4 + B_0h^6 + C_0h^8 + D_0h^{10}$$

where Z is the depth from the plane tangent at the surface vertex, c is the curvature of the surface in the vicinity of the optical axis, h is the height from the optical axis, k is the conic constant, $A_0$ is the fourth-order aspheric coefficient, $B_0$ is the sixth-order aspheric coefficient, $C_0$ is the eighth-order aspheric coefficient, and $D_0$ is the tenth-order aspheric coefficient.

In each of Table 1 through Table 4 in this Specification, numerical values of aspheric coefficients employ an exponent notation in which, for example, "e−1" signifies "10 to the −1 power". Also, values given as focal lengths f are combined focal lengths of the lens system comprising the first and second lenses.

Below, Embodiments 1 through 4 are explained referring to FIG. 2 through FIG. 17.

FIG. 2, FIG. 6, FIG. 10, and FIG. 14 are summary views of lens configurations. Distortion aberration curves are shown in FIG. 3, FIG. 7, FIG. 11, and FIG. 15; astigmatic aberration curves appear in FIG. 4, FIG. 8, FIG. 12, and FIG. 16; and chromatic/spherical aberration curves appear in FIG. 5, FIG. 9, FIG. 13, and FIG. 17.

A distortion aberration curve shows the aberration amount (the amount by which the tangent condition is not satisfied, expressed as a percentage along the horizontal axis) versus the distance from the optical axis (expressed as a percentage along the vertical axis, with the maximum distance from the optical axis within the image plane equal to 100). An astigmatic aberration curve shows the amount of aberration along the horizontal axis (in mm units) for a distance from the optical axis, similarly to a distortion aberration curve. Astigmatism is represented as aberration amounts (in mm units) in the meridional plane and in the sagittal plane. A chromatic/spherical aberration curve shows the amount of aberration along the horizontal axis (in mm units) for a distance of incidence h (F-number). In a chromatic/spherical aberration curve, aberration amounts are shown for the C line (light of wavelength 656.3 nm), the d line (light of wavelength 587.6 nm), the e line (light of wavelength 546.1 nm), the F line (light of wavelength 486.1 nm), and the g line (light of wavelength 435.8 nm). The refractivity is the refractivity for the d line (light of wavelength 587.6 nm).

Below, the radii of curvature of component lenses (in mm units), intervals between lenses (in mm units), refractivity of lens materials, Abbe number of lens materials, F-number aperture, and aspheric coefficients are listed for Embodiments 1 through 4. In Embodiment 1 through Embodiment 4, the combined focal length f is set to 1.0 mm.

TABLE 1

First Embodiment

| Radius of Curvature ($r_i$) | Distance ($d_i$) | Refractivity ($N_i$) | Abbe Number($v_i$) | Aspheric Coefficient | | | | |
|---|---|---|---|---|---|---|---|---|
| | | | | K | $A_0$ | $B_0$ | $C_0$ | $D_0$ |
| r1 = ∞ | d1 = 0.0000 | | | | | | | |
| r2 = 0.380 | d2 = 0.2130 | N2 = 1.53000 | v2 = 56.0 | 1.000e−1 | −3.000e−1 | 6.000 | 3.370e+2 | −3.788e+3 |
| r3 = 0.547 | d3 = 0.1217 | | | −1.430e+1 | 1.130e+1 | −8.410e+1 | 1.937e+3 | −6.970e+3 |
| r4 = ∞ | d4 = 0.1521 | | | | | | | |
| r5 = 0.700 | d5 = 0.2434 | N5 = 1.53000 | v5 = 56.0 | −2.700 | 9.200e−1 | −1.780e+1 | 8.670e+1 | −2.249e+2 |
| r6 = 2.536 | d6 = 0.2630 | | | 6.800 | 3.300 | −2.750e+1 | 8.660e+1 | −1.361e+2 |
| r7 = ∞ | d7 = 0.1521 | N7 = 1.51680 | v7 = 61.0 (FILTER) | | | | | |
| r8 = ∞ | d8 = 0.1000 | | | | | | | |
| r9 = ∞ | | | | | | | | |

Focal Length f = 1.0 mm
F-number Fno = 3.0

TABLE 2

Second Embodiment

| Radius of Curvature ($r_i$) | Distance ($d_i$) | Refractivity ($N_i$) | Abbe Number($v_i$) | Aspheric Coefficient | | | | |
|---|---|---|---|---|---|---|---|---|
| | | | | K | $A_0$ | $B_0$ | $C_0$ | $D_0$ |
| r1 = ∞ | d1 = 0.0000 | | | | | | | |
| r2 = 0.318 | d2 = 0.2303 | N2 = 1.53000 | v2 = 56.0 | −1.350e−1 | 9.200e−1 | −2.967e+1 | 9.242e+2 | −3.665e+3 |
| r3 = 0.426 | d3 = 0.1007 | | | −1.157e+1 | 1.940e+1 | −1.300e+2 | −8.538e+2 | 1.079e+5 |
| r4 = ∞ | d4 = 0.0720 | | | | | | | |
| r5 = 1.034 | d5 = 0.2447 | N5 = 1.53000 | v5 = 56.0 | −8.240 | −1.690 | −4.990e+1 | 8.660e+1 | 1.416e+3 |
| r6 = 4.480 | d6 = 0.2589 | | | 9.780 | 1.300 | −4.570e+1 | 2.144e+2 | −5.860e+2 |
| r7 = ∞ | d7 = 0.1439 | N7 = 1.51680 | v7 = 61.0 (FILTER) | | | | | |
| r8 = ∞ | d8 = 0.1000 | | | | | | | |
| r9 = ∞ | | | | | | | | |

Focal Length f = 1.0 mm
F-number Fno = 3.0

TABLE 3

Third Embodiment

| Radius of Curvature ($r_i$) | Distance ($d_i$) | Refractivity ($N_i$) | Abbe Number($v_i$) | Aspheric Coefficient | | | | |
|---|---|---|---|---|---|---|---|---|
| | | | | K | $A_0$ | $B_0$ | $C_0$ | $D_0$ |
| r1 = ∞ | d1 = 0.0000 | | | | | | | |
| r2 = 0.304 | d2 = 0.2297 | N2 = 1.53000 | v2 = 56.0 | −1.800e−1 | 6.680e−1 | −2.469e+1 | 1.121e+3 | −6.720e+3 |
| r3 = 0.403 | d3 = 0.0861 | | | −1.000e+1 | 2.183e+1 | −1.460e+2 | −1.697e+3 | 1.500e+5 |

TABLE 3-continued

Third Embodiment

| Radius of Curvature ($r_i$) | Distance ($d_i$) | Refractivity ($N_i$) | Abbe Number($v_i$) | Aspheric Coefficient | | | | |
|---|---|---|---|---|---|---|---|---|
| | | | | K | $A_0$ | $B_0$ | $C_0$ | $D_0$ |
| r4 = ∞ | d4 = 0.0574 | | | | | | | |
| r5 = 1.250 | d5 = 0.2440 | N5 = 1.53000 | v5 = 56.0 | −7.470 | −2.000 | −6.356e+1 | −9.070e+1 | 4.948e+3 |
| r6 = 6.300 | d6 = 0.2862 | | | −3.677e+4 | 1.860 | −5.380e+1 | 2.628e+2 | −8.160e+2 |
| r7 = ∞ | d7 = 0.1148 | N7 = 1.51680 | v7 = 61.0 (FILTER) | | | | | |
| r8 = ∞ | d8 = 0.1000 | | | | | | | |
| r9 = ∞ | | | | | | | | |

Focal Length f = 1.0 mm
F-number Fno = 3.0

TABLE 4

Fourth Embodiment

| Radius of Curvature ($r_i$) | Distance ($d_i$) | Refractivity ($N_i$) | Abbe Number($v_i$) | Aspheric Coefficient | | | | |
|---|---|---|---|---|---|---|---|---|
| | | | | K | $A_0$ | $B_0$ | $C_0$ | $D_0$ |
| r1 = ∞ | d1 = 0.0000 | | | | | | | |
| r2 = 0.303 | d2 = 0.2295 | N2 = 1.53000 | v2 = 56.0 | −2.000e−1 | 3.400e−1 | −1.290e+1 | 1.376e+3 | −1.040e+4 |
| r3 = 0.410 | d3 = 0.0861 | | | −1.220e+1 | 2.280e+1 | −1.462e+2 | −2.252e+3 | 1.673e+5 |
| r4 = ∞ | d4 = 0.0574 | | | | | | | |
| r5 = 1.401 | d5 = 0.2438 | N5 = 1.53000 | v5 = 56.0 | −1.600e+1 | −2.270 | −6.180e+1 | −2.670e+2 | 6.918e+3 |
| r6 = 7.700 | d6 = 0.2835 | | | −1.000e+6 | 1.580 | −5.410e+1 | 2.815e+2 | −9.120e+2 |
| r7 = ∞ | d7 = 0.1147 | N7 = 1.51680 | v7 = 61.0 (FILTER) | | | | | |
| r8 = ∞ | d8 = 0.1000 | | | | | | | |
| r9 = ∞ | | | | | | | | |

Focal Length f = 1.0 mm
F-number Fno = 3.0

Below, the characteristics of each of the embodiments are described. In each of the Embodiments 1 through 4, ZEONEX E48R (ZEONEX is a registered trademark, and E48R is a product number, of Nippon Zeon Co., Ltd.; hereafter simply called "Zeonex"), which is a cycloolefin plastic, was employed in the first lens $L_1$ and second lens $L_2$.

Further, both the surfaces of the first lens $L_1$ and both the surfaces of the second lens $L_2$ are aspherical. That is, the number of aspherical surfaces is four in each of the embodiments.

The Abbe number of the Zeonex E48R material of the first lens $L_1$ and second lens $L_2$ is 56 (the refractivity for the d line is 1.53). From simulation results it was found that if the Abbe number of the material of the lenses is in the range 30 to 60, no effective differences appear in the aberration and other lens performance parameters. That is, it was found that if the Abbe number is within the above range, then an imaging lens which is an object of the present invention, with various aberrations satisfactorily corrected compared with imaging lenses of the prior art, can be obtained. From this, the imaging lens of the present invention can also employ polycarbonate as the lens component material.

A filter is inserted between the lens system and the image plane. As the material of this filter, glass (with refractivity for the d line of 1.5168) was used. The various aberrations explained below were calculated assuming the presence of such filters.

EMBODIMENT 1

(A) The focal length $f_1$ of the first lens $L_1$ is 1.63 mm.
(B) The focal length $f_2$ of the second lens $L_2$ is 1.74 mm.
(C) The combined focal length f for all lenses is 1.0 mm.
(D) The back focus $b_f$ is 0.463 mm.
(E) The optical length d is 1.193 mm.
(F) The interval $D_2$ between the first lens $L_1$ and the second lens $L_2$ is 0.2738 mm.
(G) The F-number $F_{no}$ is 3.0.
Hence:

$f_1/f_2 = 1.63/1.74 = 0.9368$ $b_f/f = 0.463/1.0 = 0.463$ $d/f = 1.193/1.0 = 1.193$ $D_2/f = 0.2738/1.0 = 0.2738$ $F_{no} = 3.0$

Therefore the lens system of Embodiment 1 satisfies all of the following condition equations (1) through (5).

$0.3 < f_1/f_2 < 1.0$     (1)

$0.4 < b_f/f < 0.5$     (2)

$1.0 < d/f < 1.3$     (3)

$0.12 < D_2/f < 0.30$     (4)

$2.0 < F_{no} < 4.0$     (5)

As indicated in Table 1, the aperture diaphragm $S_1$ is provided at the position of the first surface $r_2$ (the object-side surface) of the first lens $L_1$. The second diaphragm $S_2$ is provided at the position 0.1217 mm ($d_3$=0.1217 mm) behind the second surface $r_3$ of the first lens $L_1$, and 0.1521 mm ($d_4$=0.1521 mm) in front of the first surface $r_5$ of the second lens $L_2$, that is, inserted between the first lens $L_1$ and the second lens $L_2$. The F-number is 3.0, and the combined focal length f is 1.0 mm.

Figure 2:
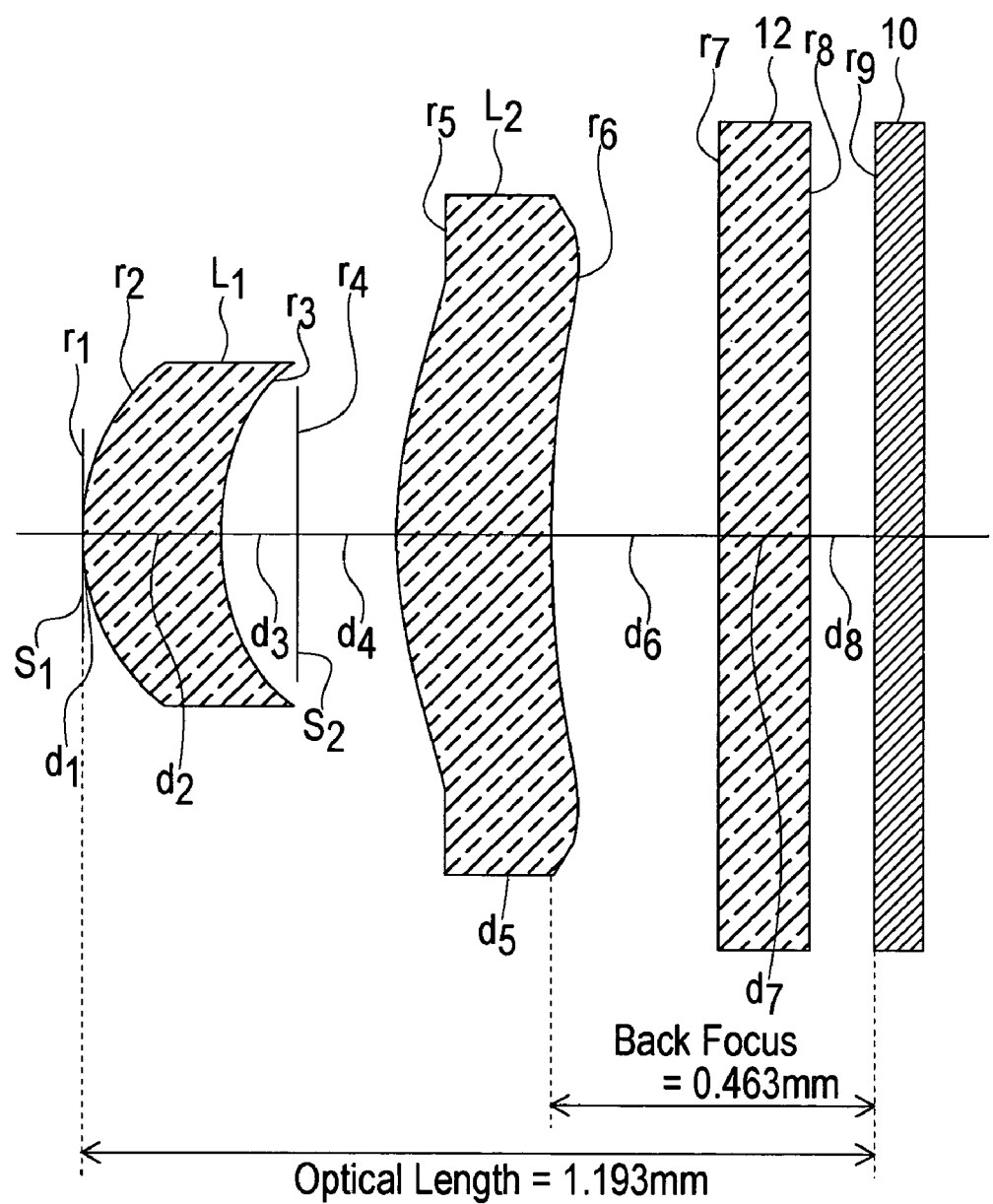
FIG. 2 is a cross-sectional view of the imaging lens of Embodiment 1.

FIG. 2 is a cross-sectional view of the imaging lens of Embodiment 1. The optical length is 1.193 mm, and the back focus is 0.463 mm, so that an adequate length can be secured for the combined focal length f. The value of $d_3+d_4$, which is the interval between the second surface $r_3$ of the first lens $L_1$ and the first surface $r_5$ of the second lens $L_2$, is set to 0.2738 mm, so that a sufficient interval is secured for insertion of the second diaphragm $S_2$ between the first lens $L_1$ and second lens $L_2$.

Figure 3:
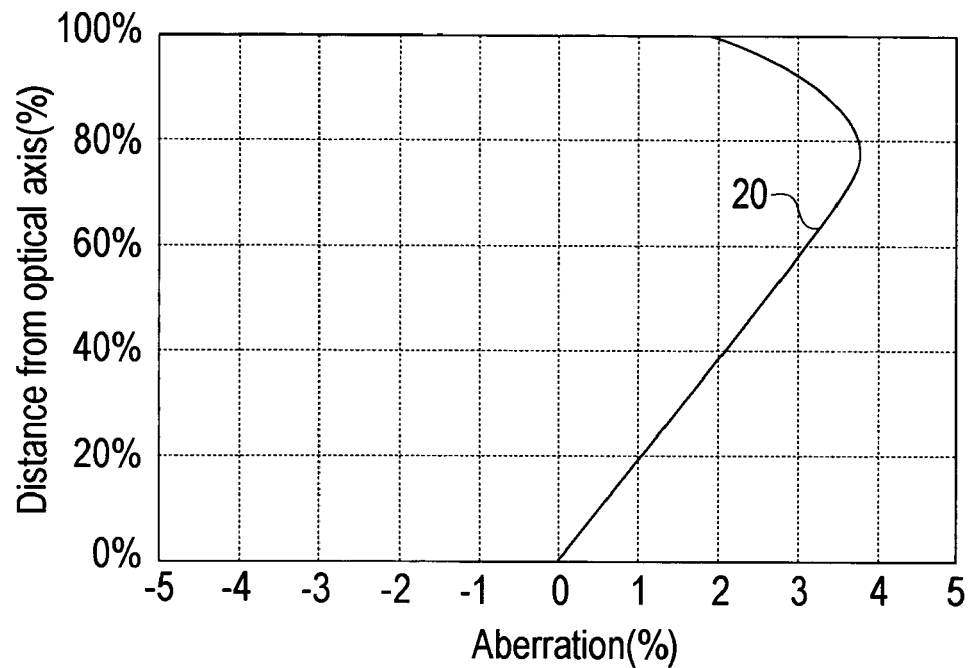
FIG. 3 is a diagram of distortion aberration of the imaging lens of Embodiment 1.
Figure 4:
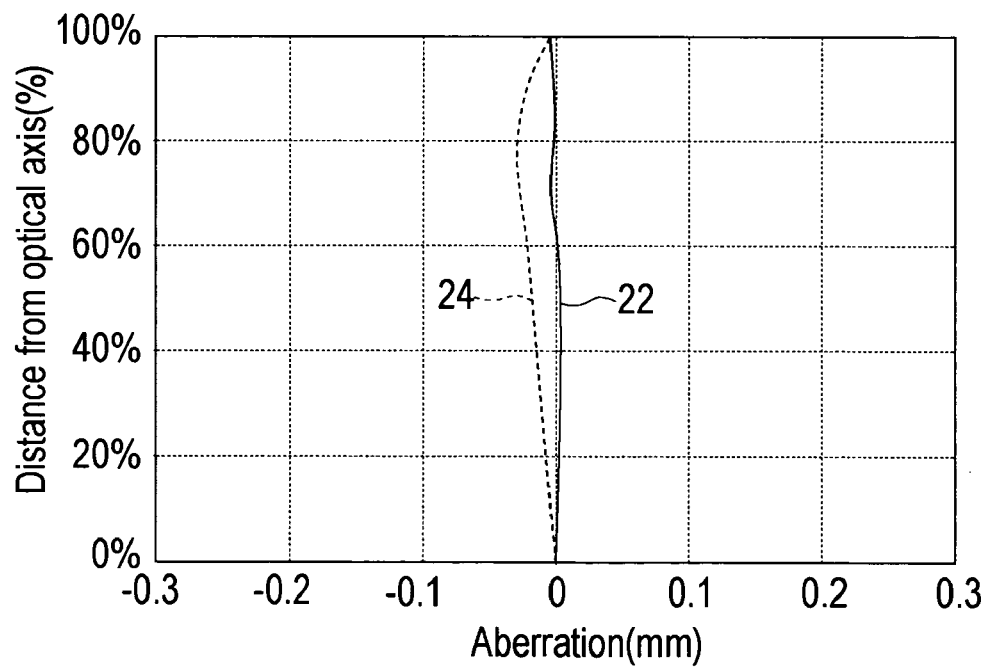
FIG. 4 is a diagram of astigmatic aberration of the imaging lens of Embodiment 1.
Figure 5:
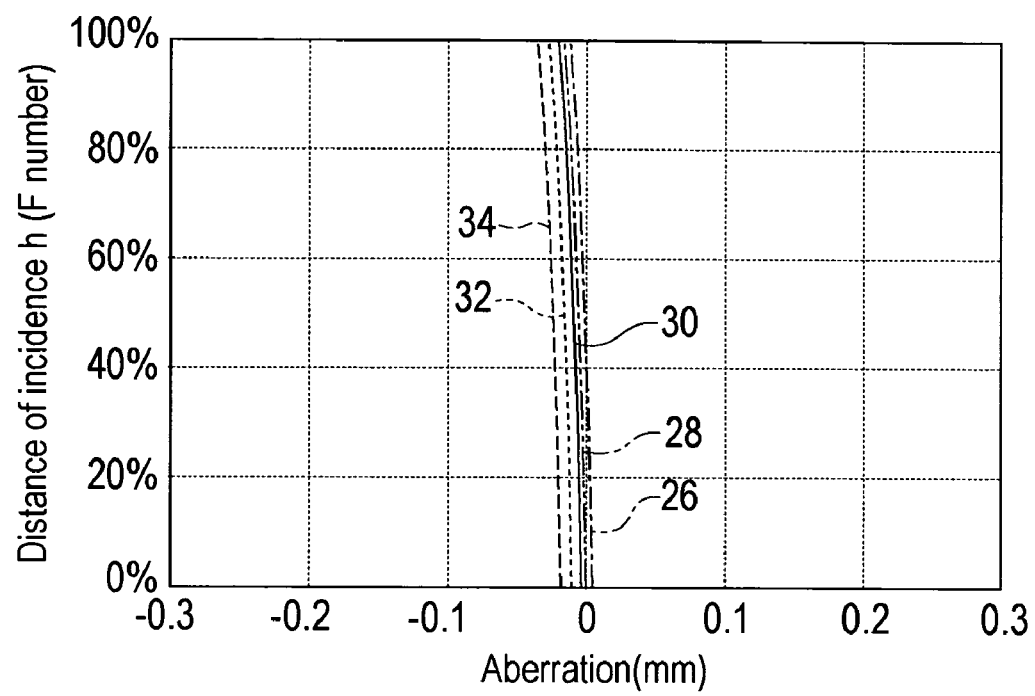
FIG. 5 is a diagram of the chromatic/spherical aberration of the imaging lens of Embodiment 1.

FIG. 3 shows the distortion aberration curve 20, FIG. 4 shows the astigmatic aberration curves (the aberration curve 22 in the meridional plane and the aberration curve 24 in the sagittal plane), and FIG. 5 shows the chromatic/spherical aberration curves (the aberration curve 26 for the C line, aberration curve 28 for the d line, aberration curve 30 for the e line, aberration curve 32 for the F line, and aberration curve 34 for the g line).

The vertical axes of the aberration curves in FIG. 3 and FIG. 4 indicate the distance from the optical axis of the image height, as a percentage. In FIG. 3 and FIG. 4, 100%, 80%, 70%, and 60% on the vertical axes correspond respectively to 0.650 mm, 0.520 mm, 0.455 mm, and 0.390 mm. The vertical axis in FIG. 5 indicates the distance of incidence h (F-number); the maximum corresponds to F3.0. The horizontal axis in FIG. 5 indicates the aberration magnitude.

The absolute value of distortion aberration is maximum, at 3.78%, at an image height of 80% (image height 0.520 mm). At image heights of 0.650 mm or less, the absolute value of the aberration is within 3.78%.

The absolute value of astigmatic aberration is maximum in the sagittal plane, at 0.0292 mm, at an image height of 80% (image height 0.520 mm). At image heights of 0.650 mm or less, the absolute value of the aberration is within 0.0292 mm.

The absolute value of chromatic/spherical aberration is maximum, at 0.0355 mm, for the g line at a distance of incidence h of 100%, and the absolute value of the aberration is everywhere within 0.0355 mm.

EMBODIMENT 2

(A) The focal length $f_1$ of the first lens $L_1$ is 1.36 mm.
(B) The focal length $f_2$ of the second lens $L_2$ is 2.48 mm.
(C) The combined focal length f for all lenses is 1.0 mm.
(D) The back focus $b_f$ is 0.454 mm.
(E) The optical length d is 1.102 mm.
(F) The interval $D_2$ between the first lens $L_1$ and the second lens $L_2$ is 0.1727 mm.
(G) The F-number $F_{no}$ is 3.0.
Hence:

$f_1/f_2$=1.36/2.48=0.5484

$b_f/f$=0.454/1.0=0.454

$d/f$=1.102/1.0=1.102

$D_2/f$=0.1727/1.0=0.1727

$F_{no}$=3.0

Therefore the lens system of Embodiment 2 satisfies all of the following condition equations (1) through (5).

$$0.3 < f_1/f_2 < 1.0 \quad (1)$$

$$0.4 < b_f/f < 0.5 \quad (2)$$

$$1.0 < d/f < 1.3 \quad (3)$$

$$0.12 < D_2/f < 0.30 \quad (4)$$

$$2.0 < F_{no} < 4.0 \quad (5)$$

As indicated in Table 2, the aperture diaphragm $S_1$ is provided at the position of the first surface $r_2$ (the object-side surface) of the first lens $L_1$. The second diaphragm $S_2$ is provided at the position 0.1007 mm ($d_3$=0.1007 mm) behind the second surface $r_3$ of the first lens $L_1$, and 0.0720 mm ($d_4$=0.0720 mm) in front of the first surface $r_5$ of the second lens $L_2$, that is, inserted between the first lens $L_1$ and the second lens $L_2$. The F-number is 3.0, and the combined focal length f is 1.0 mm.

Figure 6:
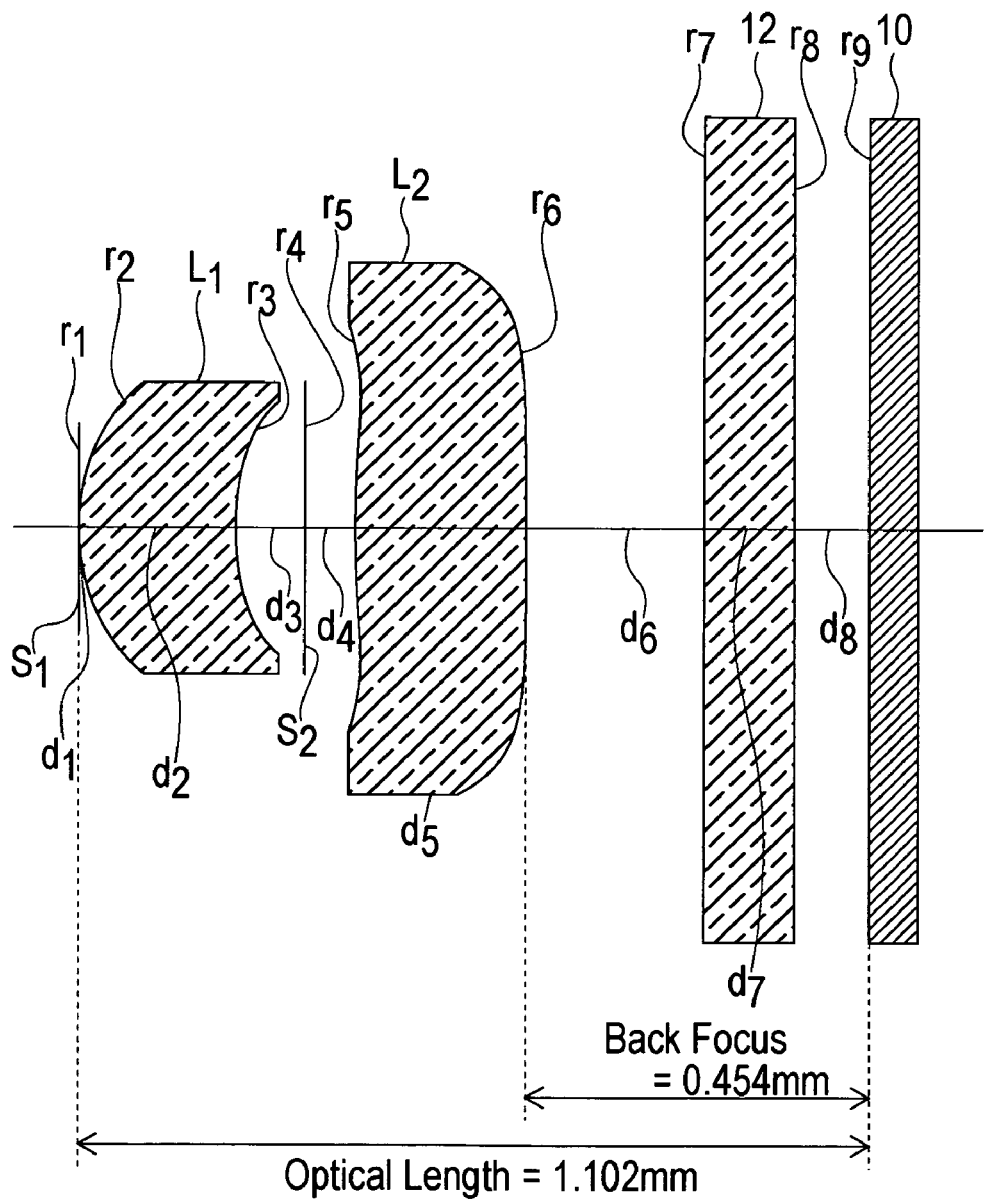
FIG. 6 is a cross-sectional view of the imaging lens of Embodiment 2.

FIG. 6 is a cross-sectional view of the imaging lens of Embodiment 2. The optical length is 1.102 mm, and the back focus is 0.454 mm, so that an adequate length can be secured for the combined focal length f. The value of $d_3+d_4$, which is the interval between the second surface $r_3$ of the first lens $L_1$ and the first surface $r_5$ of the second lens $L_2$, is set to 0.1727 mm, so that a sufficient interval is secured for insertion of the second diaphragm $S_2$ between the first lens $L_1$ and second lens $L_2$.

Figure 7:
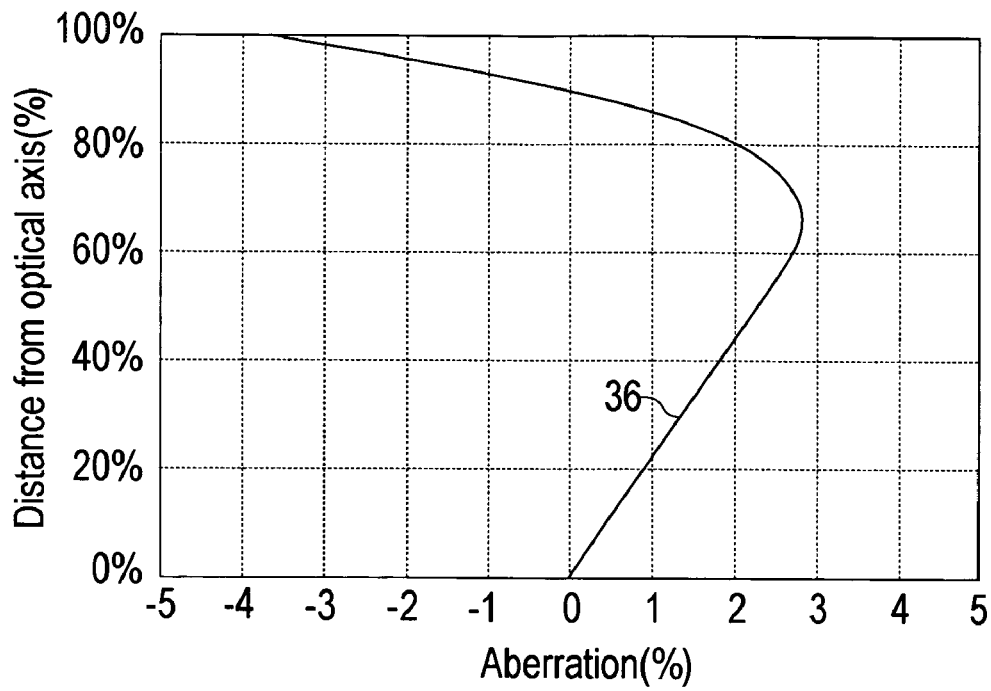
FIG. 7 is a diagram of distortion aberration of the imaging lens of Embodiment 2.
Figure 8:
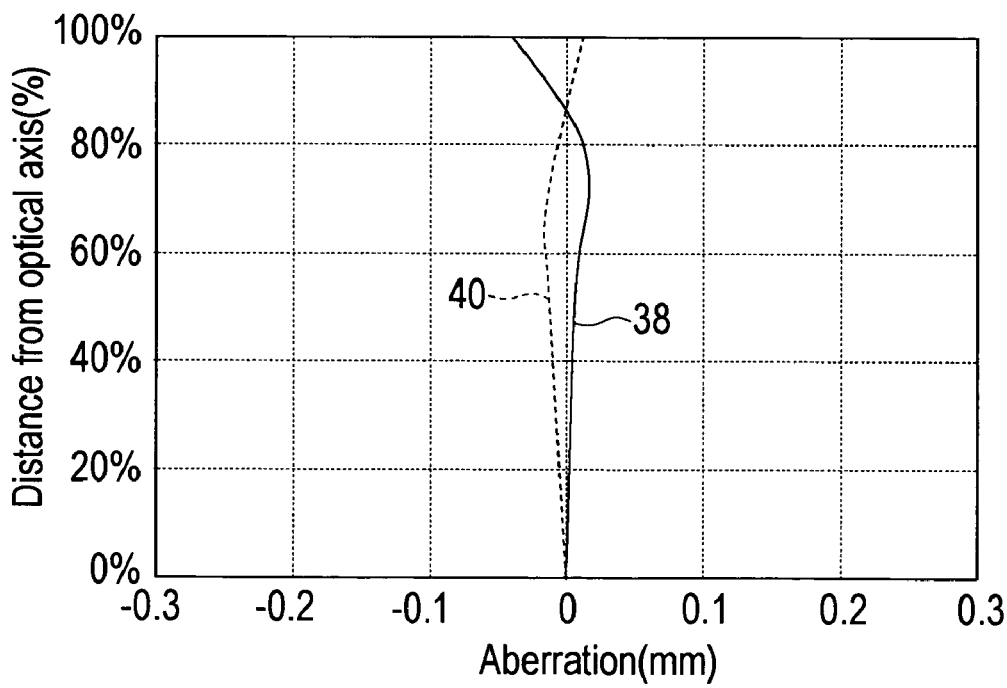
FIG. 8 is a diagram of astigmatic aberration of the imaging lens of Embodiment 2.
Figure 9:
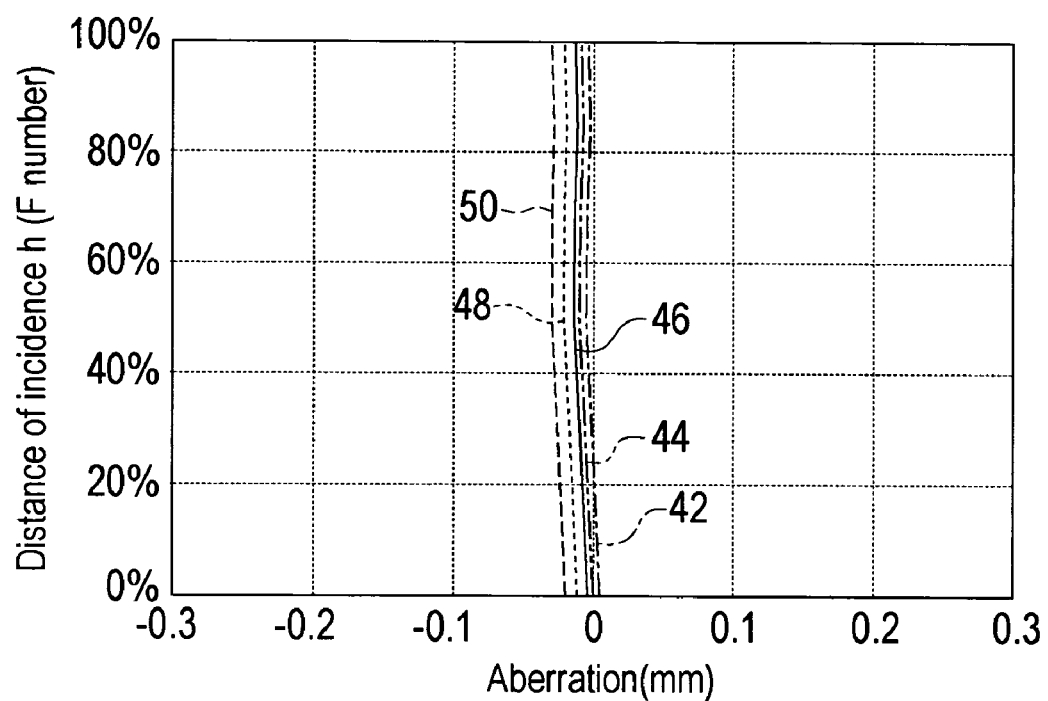
FIG. 9 is a diagram of the chromatic/spherical aberration of the imaging lens of Embodiment 2.

FIG. 7 shows the distortion aberration curve 36, FIG. 8 shows the astigmatic aberration curves (the aberration curve 38 in the meridional plane and the aberration curve 40 in the sagittal plane), and FIG. 9 shows the chromatic/spherical aberration curves (the aberration curve 42 for the C line, aberration curve 44 for the d line, aberration curve 46 for the e line, aberration curve 48 for the F line, and aberration curve 50 for the g line).

The vertical axes of the aberration curves in FIG. 7 and FIG. 8 indicate the distance from the optical axis of the image height, as a percentage. In FIG. 7 and FIG. 8, 100%, 80%, 70%, and 60% on the vertical axes correspond respectively to 0.650 mm, 0.520 mm, 0.455 mm, and 0.390 mm. The vertical axis in FIG. 9 indicates the distance of incidence h (F-number); the maximum corresponds to F3.0. The horizontal axis in FIG. 9 indicates the aberration magnitude.

The absolute value of distortion aberration is maximum, at 3.63%, at an image height of 100% (image height 0.650 mm). At image heights of 0.650 mm or less, the absolute value of the aberration is within 3.63%.

The absolute value of astigmatic aberration is maximum in the meridional plane, at 0.0399 mm, at an image height of 100% (image height 0.650 mm). At image heights of 0.650 mm or less, the absolute value of the aberration is within 0.0399 mm.

The absolute value of chromatic/spherical aberration is maximum, at 0.0300 mm, for the g line at a distance of incidence h of 100%, and the absolute value of the aberration is everywhere within 0.0300 mm.

EMBODIMENT 3

(A) The focal length $f_1$ of the first lens $L_1$ is 1.29 mm.
(B) The focal length $f_2$ of the second lens $L_2$ is 2.89 mm.
(C) The combined focal length f for all lenses is 1.0 mm.
(D) The back focus $b_f$ is 0.462 mm.
(E) The optical length d is 1.079 mm.
(F) The interval $D_2$ between the first lens $L_1$ and the second lens $L_2$ is 0.1435 mm.
(G) The F-number $F_{no}$ is 3.0.

Hence:

$f_1/f_2 = 1.29/2.89 \; 0.4464$ $b_f/f = 0.462/1.0 = 0.462$ $d/f = 1.079/1.0 = 1.079$ $D_2/f = 0.1435/1.0 = 0.1435$ $F_{no} = 3.0$

Therefore the lens system of Embodiment 3 satisfies all of the following condition equations (1) through (5).

$$0.3 < f_1/f_2 < 1.0 \tag{1}$$

$$0.4 < b_f/f < 0.5 \tag{2}$$

$$1.0 < d/f < 1.3 \tag{3}$$

$$0.12 < D_2/f < 0.30 \tag{4}$$

$$2.0 < F_{no} < 4.0 \tag{5}$$

As indicated in Table 3, the aperture diaphragm $S_1$ is provided at the position of the first surface $r_2$ (the object-side surface) of the first lens $L_1$. The second diaphragm $S_2$ is provided at the position 0.0861 mm ($d_3 = 0.0861$ mm) behind the second surface $r_3$ of the first lens $L_1$, and 0.0574 mm ($d_4 = 0.0574$ mm) in front of the first surface $r_5$ of the second lens $L_2$, that is, inserted between the first lens $L_1$ and the second lens $L_2$. The F-number is 3.0, and the combined focal length f is 1.0 mm.

Figure 10:
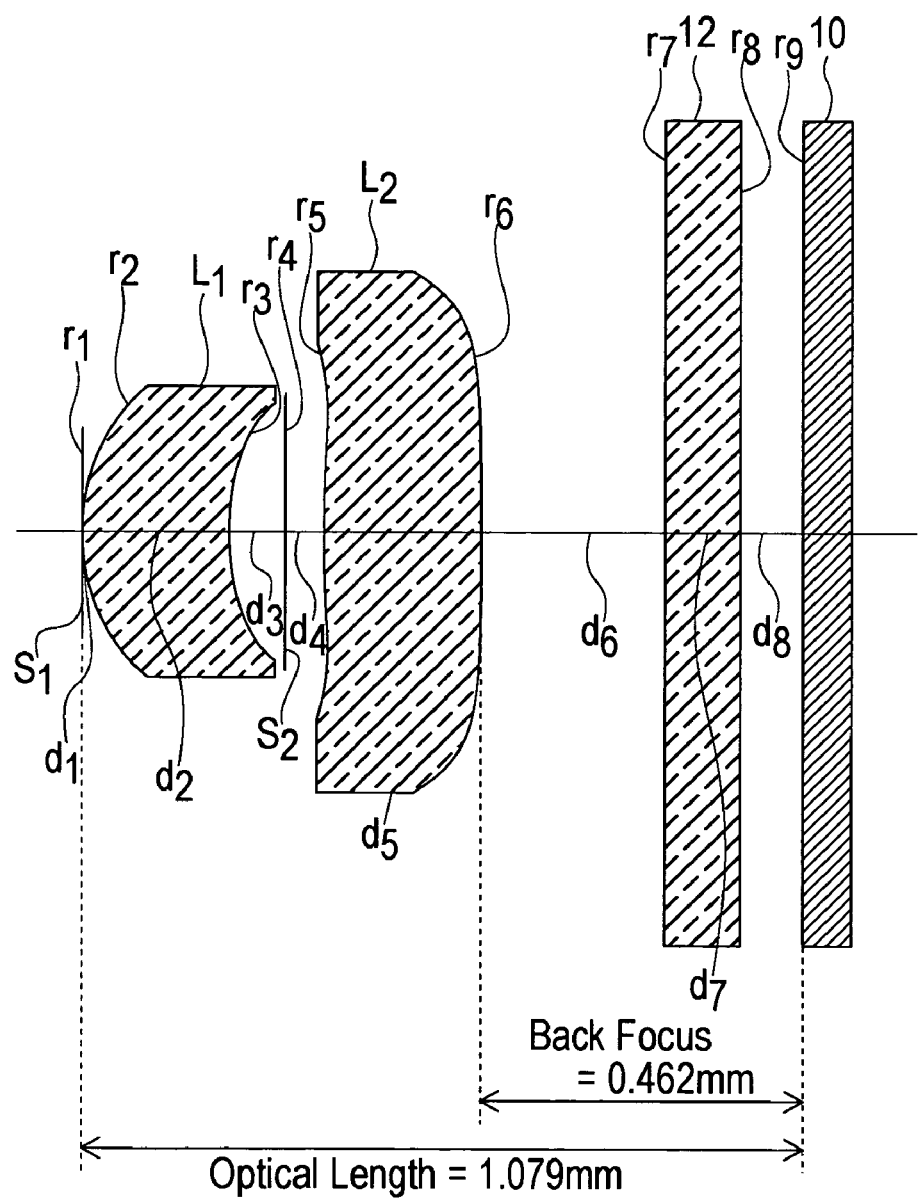
FIG. 10 is a cross-sectional view of the imaging lens of Embodiment 3.

FIG. 10 is a cross-sectional view of the imaging lens of Embodiment 3. The optical length is 1.079 mm, and the back focus is 0.462 mm, so that an adequate length can be secured for the combined focal length f. The value of $d_3 + d_4$, which is the interval between the second surface $r_3$ of the first lens $L_1$ and the first surface $r_5$ of the second lens $L_2$, is set to 0.1435 mm, so that a sufficient interval is secured for insertion of the second diaphragm $S_2$ between the first lens $L_1$ and second lens $L_2$.

Figure 11:
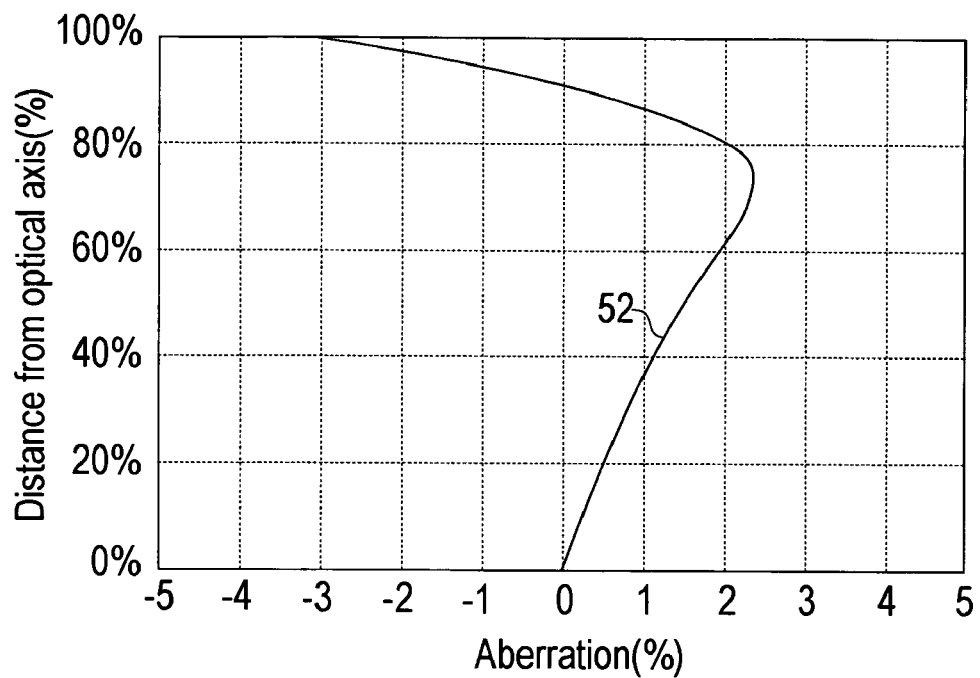
FIG. 11 is a diagram of distortion aberration of the imaging lens of Embodiment 3.
Figure 12:
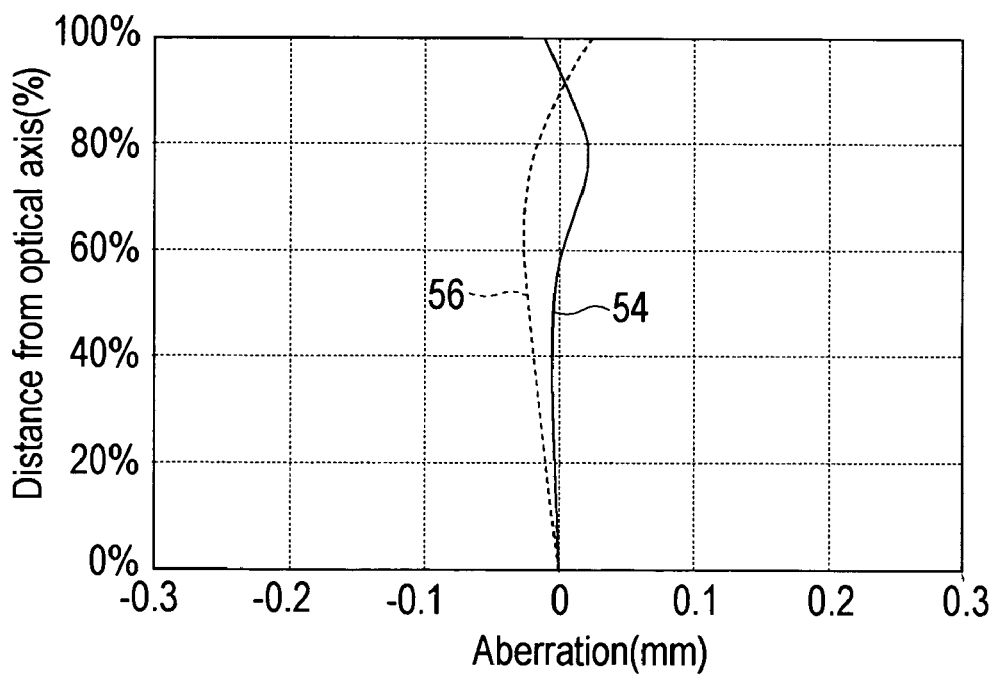
FIG. 12 is a diagram of astigmatic aberration of the imaging lens of Embodiment 3.
Figure 13:
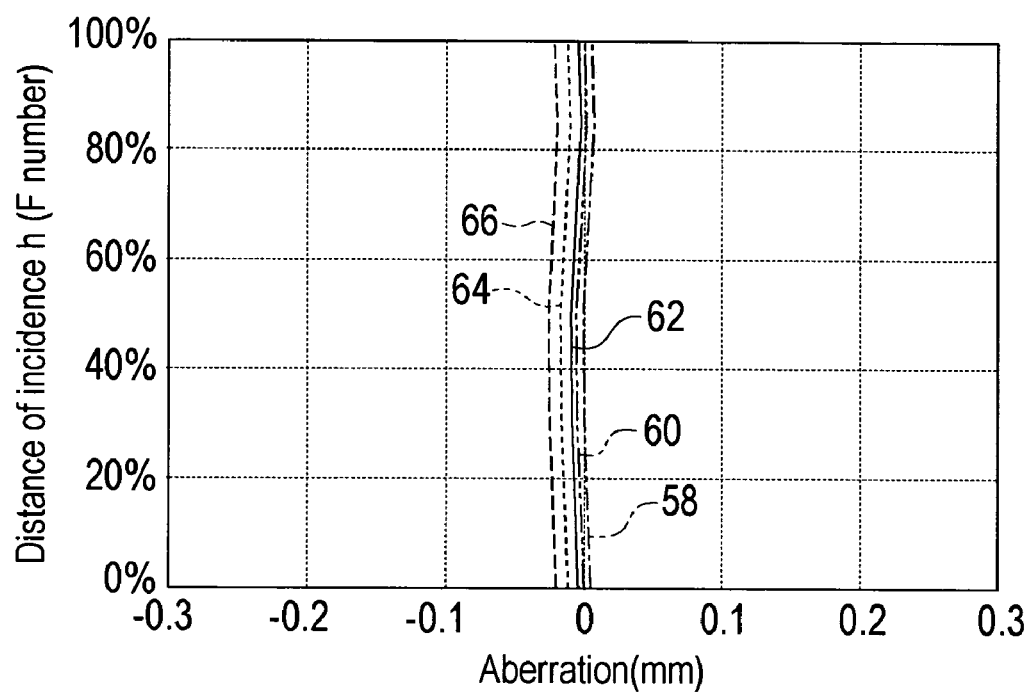
FIG. 13 is a diagram of the chromatic/spherical aberration of the imaging lens of Embodiment 3.

FIG. 11 shows the distortion aberration curve 52, FIG. 12 shows the astigmatic aberration curves (the aberration curve 54 in the meridional plane and the aberration curve 56 in the sagittal plane), and FIG. 13 shows the chromatic/spherical aberration curves (the aberration curve 58 for the C line, aberration curve 60 for the d line, aberration curve 62 for the e line, aberration curve 64 for the F line, and aberration curve 66 for the g line).

The vertical axes of the aberration curves in FIG. 11 and FIG. 12 indicate the distance from the optical axis of the image height, as a percentage, and each vertical axis indicates the aberration in percentage terms and in mm units. In FIG. 11 and FIG. 12, 100%, 80%, 70%, and 60% on the vertical axes correspond respectively to 0.645 mm, 0.516 mm, 0.451 mm, and 0.387 mm. The vertical axis in FIG. 13 indicates the distance of incidence h (F-number); the maximum corresponds to F3.0. The horizontal axis in FIG. 13 indicates the aberration magnitude.

The absolute value of distortion aberration is maximum, at 3.07%, at an image height of 100% (image height 0.645 mm). At image heights of 0.645 mm or less, the absolute value of the aberration is within 3.07%.

The absolute value of astigmatic aberration is maximum in the sagittal plane, at 0.0261 mm, at an image height of 60% (image height 0.387 mm). At image heights of 0.645 mm or less, the absolute value of the aberration is within 0.0261 mm.

The absolute value of chromatic/spherical aberration is maximum, at 0.0258 mm, for the g line at a distance of incidence h of 50%, and the absolute value of the aberration is everywhere within 0.0258 mm.

EMBODIMENT 4

(A) The focal length $f_1$ of the first lens $L_1$ is 1.26 mm.
(B) The focal length $f_2$ of the second lens $L_2$ is 3.19 mm.
(C) The combined focal length f for all lenses is 1.0 mm.
(D) The back focus $b_f$ is 0.459 mm.
(E) The optical length d is 1.076 mm.
(F) The interval $D_2$ between the first lens $L_1$ and the second lens $L_2$ is 0.1435 mm.
(G) The F-number $F_{no}$ is 3.0.

Hence:

$f_1/f_2 = 1.26/3.19 = 0.3950$ $b_f/f = 0.459/1.0 = 0.459$ $d/f = 1.076/1.0 = 1.076$ $D_2/f = 0.1435/1.0 = 0.1435$ $F_{no} = 3.0$

Therefore the lens system of Embodiment 4 satisfies all of the following condition equations (1) through (5).

$$0.3 < f_1/f_2 < 1.0 \tag{1}$$

$$0.4 < b_f/f < 0.5 \tag{2}$$

$$1.0 < d/f < 1.3 \tag{3}$$

$$0.12 < D_2/f < 0.30 \tag{4}$$

$$2.0 < F_{no} < 4.0 \tag{5}$$

As indicated in Table 4, the aperture diaphragm $S_1$ is provided at the position of the first surface $r_2$ (the object-side surface) of the first lens $L_1$. The second diaphragm $S_2$ is provided at the position 0.0861 mm ($d_3 = 0.0861$ mm) behind the second surface $r_3$ of the first lens $L_1$, and 0.0574 mm ($d_4 = 0.0574$ mm) in front of the first surface $r_5$ of the second lens $L_2$, that is, inserted between the first lens $L_1$ and the second lens $L_2$. The F-number is 3.0, and the combined focal length f is 1.0 mm.

Figure 14:
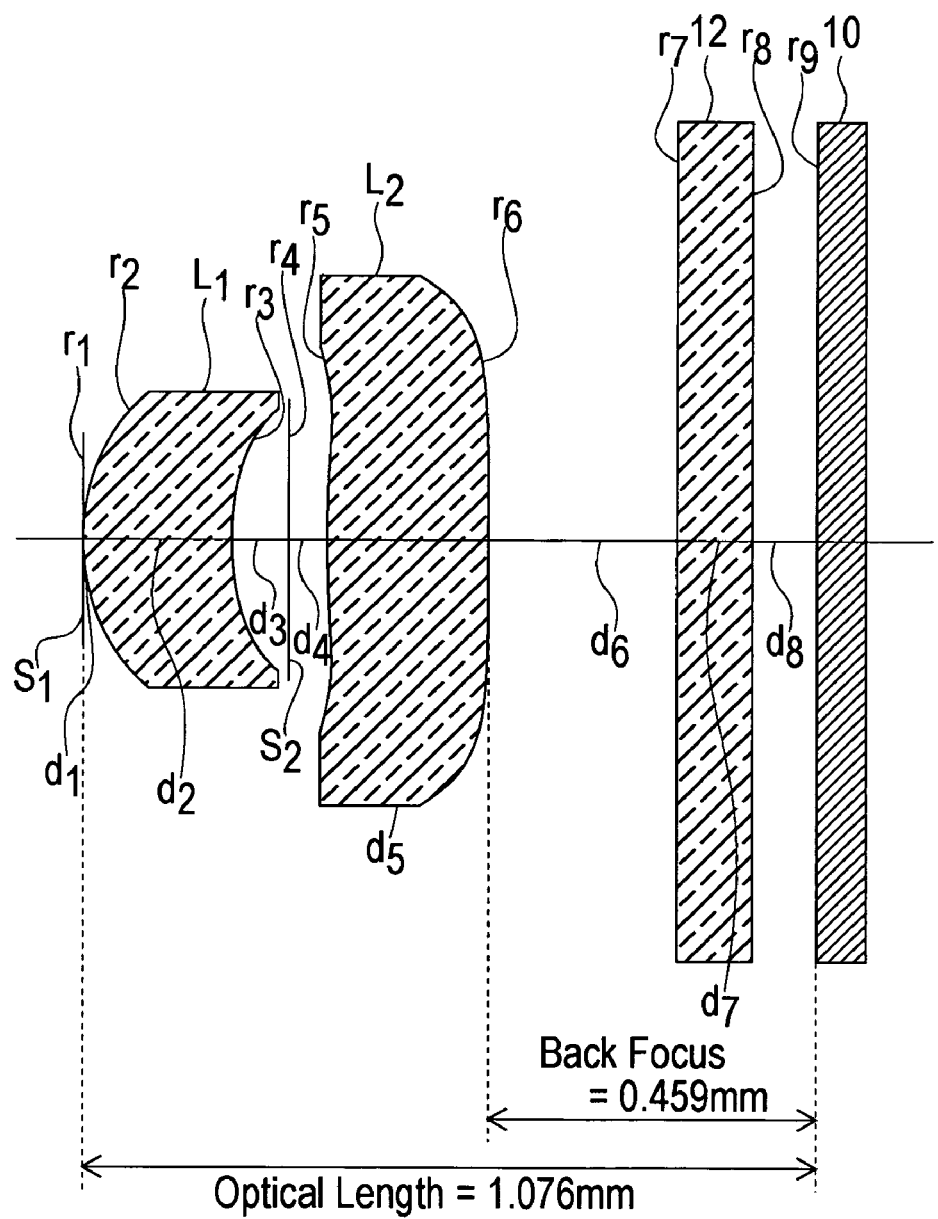
FIG. 14 is a cross-sectional view of the imaging lens of Embodiment 4.

FIG. 14 is a cross-sectional view of the imaging lens of Embodiment 4. The optical length is 1.076 mm, and the back focus is 0.459 mm, so that an adequate length can be secured for the combined focal length f. The value of $d_3 + d_4$, which is the interval between the second surface $r_3$ of the first lens $L_1$ and the first surface $r_5$ of the second lens $L_2$, is set to 0.1435 mm, so that a sufficient interval is secured for insertion of the second diaphragm $S_2$ between the first lens $L_1$ and second lens $L_2$.

Figure 15:
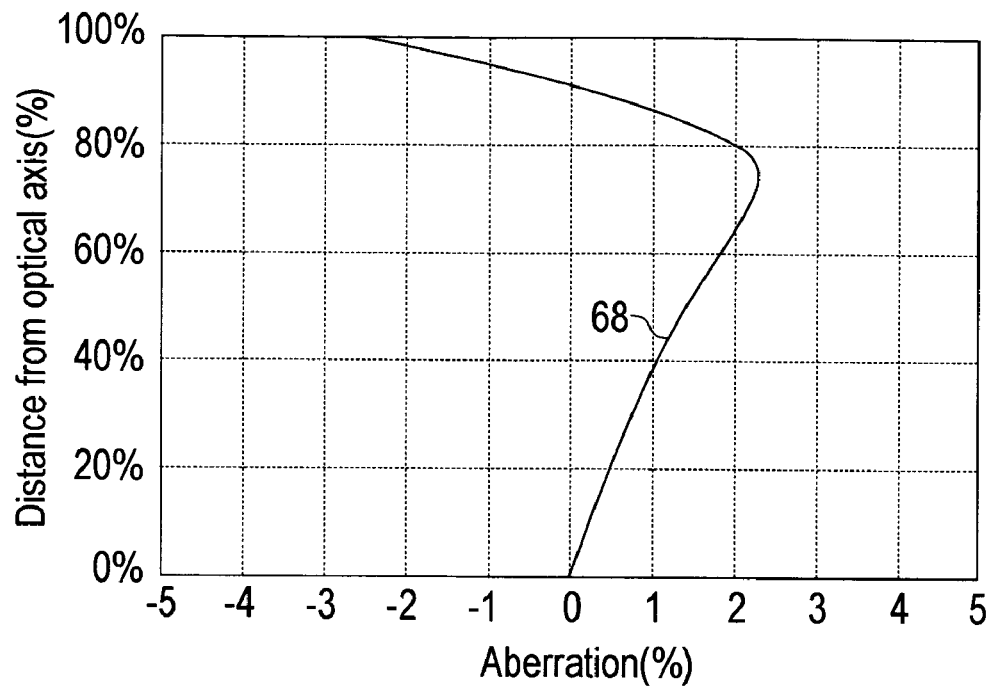
FIG. 15 is a diagram of distortion aberration of the imaging lens of Embodiment 4.
Figure 16:
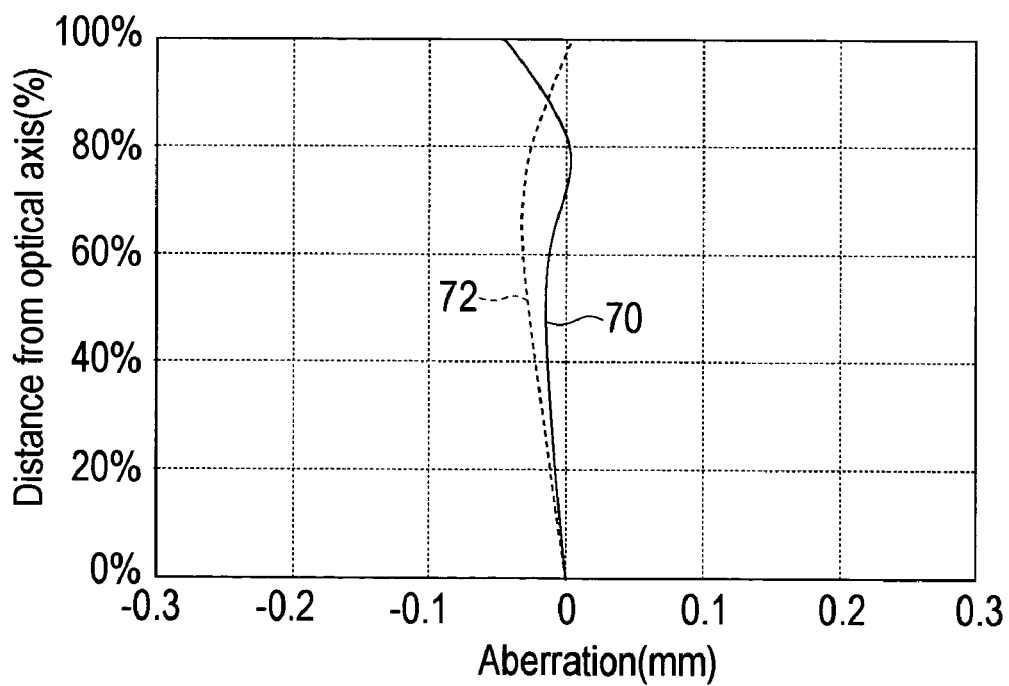
FIG. 16 is a diagram of astigmatic aberration of the imaging lens of Embodiment 4; and, FIG. 17 is a diagram of the chromatic/spherical aberration of the imaging lens of Embodiment 4.
Figure 17:
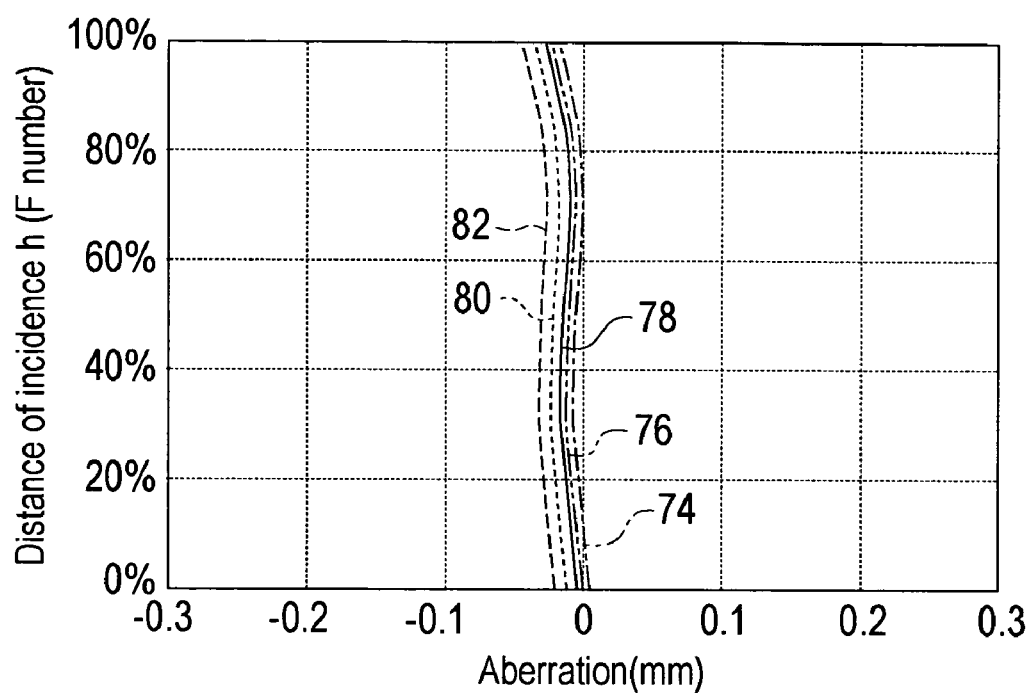

FIG. 15 shows the distortion aberration curve 68, FIG. 16 shows the astigmatic aberration curves (the aberration curve 70 in the meridional plane and the aberration curve 72 in the sagittal plane), and FIG. 17 shows the chromatic/spherical aberration curves (the aberration curve 74 for the C line, aberration curve 76 for the d line, aberration curve 78 for the e line, aberration curve 80 for the F line, and aberration curve 82 for the g line).

The vertical axes of the aberration curves in FIG. 15 and FIG. 16 indicate the distance from the optical axis of the image height, as a percentage. In FIG. 15 and FIG. 16, 100%, 80%, 70%, and 60% on the vertical axes correspond respectively to 0.645 mm, 0.516 mm, 0.451 mm, and 0.387 mm. The vertical axis in FIG. 17 indicates the distance of incidence h (F-number); the maximum corresponds to F3.0. The horizontal axis in FIG. 17 indicates the aberration magnitude.

The absolute value of distortion aberration is maximum, at 2.53%, at an image height of 100% (image height 0.645 mm). At image heights of 0.645 mm or less, the absolute value of the aberration is within 2.53%.

The absolute value of astigmatic aberration is maximum in the meridional plane, at 0.0461 mm, at an image height of 100% (image height 0.645 mm). At image heights of 0.645 mm or less, the absolute value of the aberration is within 0.0461 mm.

The absolute value of chromatic/spherical aberration is maximum, at 0.0446 mm, for the g line at a distance of incidence h of 100%, and the absolute value of the aberration is everywhere within 0.0446 mm.

Thus as explained above, the present invention enables realization of an imaging lens, with various aberrations satisfactorily corrected, and with the ratio of the optical length to the combined focal length of the imaging lens system at most approximately 1.2 (only 1.193 even for the imaging lens of Embodiment 1, for which the ratio was largest), and suitable for use in small-size CCD cameras suited for mounting in portable telephones and similar.

On the other hand, the ratio of the back focus to the combined focal length of the imaging lens system is also approximately 0.46 (0.454 even for the imaging lens of Embodiment 2, for which the ratio was smallest), so that adequate length could be secured. That is, by means of an imaging lens of the present invention, sufficient back focus length is ensured to enable the insertion of cover glass 12 or other components between the image-side surface $r_6$ of the second lens $L_2$ and the image plane, as described in each of the above embodiments of the present invention.

Also, the value of $D_2/f$, which is the ratio of the distance between the second surface $r_3$ of the first lens $L_1$ and the first surface $r_5$ of the second lens $L_2$ to the focal length f for the entire imaging lens system, is set to 0.14 to 0.28 approximately, and is set to 0.1435 even in Embodiments 3 and 4, in which the ratio is set to its smallest value. That is, a sufficient interval is secured for insertion of a second diaphragm $S_2$ between the first lens $L_1$ and the second lens $L_2$.

Further, an imaging lens of the present invention can employ lenses formed from material with an Abbe number of 30 to 60, as a result of which cycloolefin plastic or polycarbonate materials can be used as lens materials. Consequently there is no need to use expensive aspherical molded glass, so that low-cost manufacturing becomes possible, and the lens weight can be decreased as well.

As is clear from the above explanation, an imaging lens of the present invention can be regarded as suitable for application as a camera lens for incorporation not only in portable telephone sets, personal computers and digital cameras, but also as a camera lens for incorporation into PDAs (personal digital assistants), as a camera lens for embedding in toys comprising image recognition functions, and as a camera lens for incorporation into surveillance, inspection, and crime-prevention equipment.

What is claimed is:

1. An imaging lens, having an aperture diaphragm $S_1$, first lens $L_1$, second diaphragm $S_2$, and second lens $L_2$, and wherein said imaging lens is configured by positioning, in order from an object side to an image side, the aperture diaphragm $S_1$, first lens $L_1$, second diaphragm $S_2$, and second lens $L_2$;

said first lens $L_1$ has a meniscus shape with convex surface facing the object side, and has positive refractive power;

said second lens $L_2$ has a meniscus shape with convex surface facing the object side, and has positive refractive power; and, both surfaces of said first lens $L_1$ and both surfaces of said second lens $L_2$ are aspherical, and satisfy the following conditions:

$$0.3 < f_1/f_2 < 1.0 \quad (1)$$

$$0.4 < b_f/f < 0.5 \quad (2)$$

$$1.0 < d/f < 1.3 \quad (3)$$

$$0.12 < D_2/f < 0.30 \quad (4)$$

$$2.0 < F_{no} < 4.0 \quad (5)$$

where f is the combined focal length of the imaging lens, $f_1$ is the focal length of the first lens $L_1$, $f_2$ is the focal length of the second lens $L_2$, $b_f$ is the distance (in air) from the image-side surface of the second lens $L_2$ to the image plane, d is the distance (in air) from the object-side surface of the first lens $L_1$ to the image plane, $D_2$ is the interval between the first lens $L_1$ and the second lens $L_2$, and $F_{no}$ is the F-number.

2. The imaging lens according to claim 1, wherein said first lens $L_1$ and said second lens $L_2$ making up the imaging lens are formed from material with an Abbe number between 30 and 60.

3. The imaging lens according to claim 1, wherein said first lens $L_1$ and said second lens $L_2$ making up the imaging lens are formed from cycloolefin plastic or polycarbonate materials.

4. The imaging lens according to claim 2, wherein said first lens $L_1$ and said second lens $L_2$ making up the imaging lens are formed from cycloolefin plastic or polycarbonate materials.

* * * * *

UNITED STATES PATENT AND TRADEMARK OFFICE
CERTIFICATE OF CORRECTION

PATENT NO. : 7,110,190 B2
APPLICATION NO. : 10/873111
DATED : September 19, 2006
INVENTOR(S) : Do et al.

It is certified that error appears in the above-identified patent and that said Letters Patent is hereby corrected as shown below:

Title page item 73 should read –
\*\*Assignees': Milestone Co., Ltd,. --Tokyo-- (JP)
Satoshi Do, --Saitama-- (JP).\*\*

Signed and Sealed this

Twenty-fourth Day of August, 2010

David J. Kappos
*Director of the United States Patent and Trademark Office*